US010467308B2

(12) United States Patent
Ramesh et al.

(10) Patent No.: US 10,467,308 B2
(45) Date of Patent: Nov. 5, 2019

(54) METHOD AND SYSTEM FOR PROCESSING SOCIAL MEDIA DATA FOR CONTENT RECOMMENDATION

(71) Applicant: Conduent Business Services, LLC, Dallas, TX (US)

(72) Inventors: Palghat S Ramesh, Pittsford, NY (US); Arvind Agarwal, New Delhi (IN); Veerasundaravel Thirugnanasundaram, Webster, NY (US); Saurabh Kataria, Rochester, NY (US); Ion Ho, Rochester, NY (US)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 388 days.

(21) Appl. No.: 15/335,505

(22) Filed: Oct. 27, 2016

(65) Prior Publication Data

US 2018/0121549 A1 May 3, 2018

(51) Int. Cl.
*G06F 16/9535* (2019.01)
*G06F 17/27* (2006.01)
*G06Q 50/00* (2012.01)

(52) U.S. Cl.
CPC ........ *G06F 16/9535* (2019.01); *G06F 17/278* (2013.01); *G06F 17/2785* (2013.01)

(58) Field of Classification Search
CPC ............... G06F 16/9535; G06F 17/278; G06F 17/2785; G06F 17/30867; G06Q 50/01
USPC ......................................................... 707/754
See application file for complete search history.

(56) References Cited

U.S. PATENT DOCUMENTS

| 8,589,378 | B2 | 11/2013 | Liu et al. |
| 8,996,530 | B2 | 3/2015 | LuVogt et al. |
| 9,270,767 | B2 | 2/2016 | Langlois et al. |
| 2012/0323794 | A1* | 12/2012 | Livshits ................. G06Q 30/02 705/80 |
| 2013/0290339 | A1* | 10/2013 | LuVogt ............. G06F 17/30867 707/740 |
| 2014/0280548 | A1* | 9/2014 | Langlois ................. H04L 67/22 709/204 |
| 2014/0280549 | A1 | 9/2014 | Rajan et al. |
| 2015/0178282 | A1 | 6/2015 | Gorur et al. |
| 2016/0371378 | A1* | 12/2016 | Fan ................... G06F 17/30867 |
| 2018/0101774 | A1* | 4/2018 | Werris .................... H04W 4/80 |

FOREIGN PATENT DOCUMENTS

WO   WO 2016038471 A1   3/2016

* cited by examiner

*Primary Examiner* — Evan Aspinwall
(74) *Attorney, Agent, or Firm* — Jones Robb, PLLC

(57) ABSTRACT

The disclosed embodiments illustrate methods and systems for processing social media data for content recommendation to a user. The method includes extracting a set of entity data from the social media data of the user. The method further includes extracting semantic data of each entity data in the extracted set of entity data from one or more knowledge databases over a communication network. The method further includes generating a user-interest vector of the user. The user-interest vector of the user is generated based on at least a mapping of the extracted semantic data of each entity data with one or more leaf nodes in an interest taxonomy. The generated user-interest vector is further utilized for recommending targeted content to the user.

16 Claims, 4 Drawing Sheets

METHOD AND SYSTEM FOR PROCESSING SOCIAL MEDIA DATA FOR CONTENT RECOMMENDATION

TECHNICAL FIELD

The presently disclosed embodiments are related, in general, to a data processing system. More particularly, the presently disclosed embodiments are related to a method and a system for processing social media data for content recommendation to a user.

BACKGROUND

With the widespread usage of social media platforms, such as Facebook™ LinkedIn™, Twitter™, and/or Instagram™, millions of registered users are able to interact with each other and express their emotions about various events, such as personal events, professional events, or other events occurring around them. Such interaction of the users on the social media platforms generates a vast amount of data that may offer various key insights about preferences and interests of the users. However, such data from the social media platforms may be noisy and unstructured. Additionally, the data is multi-modal in form of text, images, videos, and/or the like, which may make mining useful information to ascertain user's interest a hard problem. Further, various efforts have been made for mining the useful information about the user's interests from profiles of the users on the social media platforms. While these profiles may contain some explicit information about the user's interests, more often than not, user's interests are implicit in user's actions on the social media platforms. Therefore, there is a need for a method and a system that can facilitate the processing of the data extracted from the social media platforms and hence, inferring the useful information about the user's interests in much easier, efficient, useful, and displayable manner.

Further, limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for processing social media data, by a computing server, for content recommendation to a user. The method includes extracting, by a data extracting processor at the computing server, a set of entity data from the social media data of the user. The method further includes extracting, by the data extracting processor, semantic data of each entity data in the extracted set of entity data from one or more knowledge databases over a communication network. The method further includes generating, by a profile generating processor at the computing server, a user-interest vector of the user. The user-interest vector of the user is generated based on at least a mapping of the extracted semantic data of each entity data with one or more leaf nodes in an interest taxonomy. The generated user-interest vector is further utilized for recommending targeted content to the user.

According to embodiments illustrated herein, there is provided a system for processing social media data for content recommendation to a user. The system includes a data extracting processor that is configured to extract a set of entity data from the social media data of the user. The data extracting processor is further configured to extract semantic data of each entity data in the extracted set of entity data from one or more knowledge databases over a communication network. The system further includes a profile generating processor that is configured to generate a user-interest vector of the user. The user-interest vector of the user is generated based on at least a mapping of the extracted semantic data of each entity data with one or more leaf nodes in an interest taxonomy. The generated user-interest vector is further utilized for recommending targeted content to the user.

According to embodiment illustrated herein, there is provided a computer program product for use with a computer. The computer program product includes a non-transitory computer readable medium. The non-transitory computer readable medium stores a computer program code for processing social media data for content recommendation to a user. The computer program code is executable by one or more processors to extract a set of entity data from the social media data of the user. The social media data is extracted from one or more social media platforms over a communication network. The computer program code is further executable by the one or more processors to extract semantic data of each entity data in the extracted set of entity data from one or more knowledge databases over the communication network. The computer program code is further executable by the one or more processors to generate a user-interest vector of the user. The user-interest vector of the user is generated based on at least a mapping of the extracted semantic data of each entity data with one or more leaf nodes in an interest taxonomy. The generated user-interest vector is further utilized for recommending targeted content to the user.

BRIEF DESCRIPTION OF DRAWINGS

The accompanying drawings illustrate the various embodiments of systems, methods, and other aspects of the disclosure. A person having ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
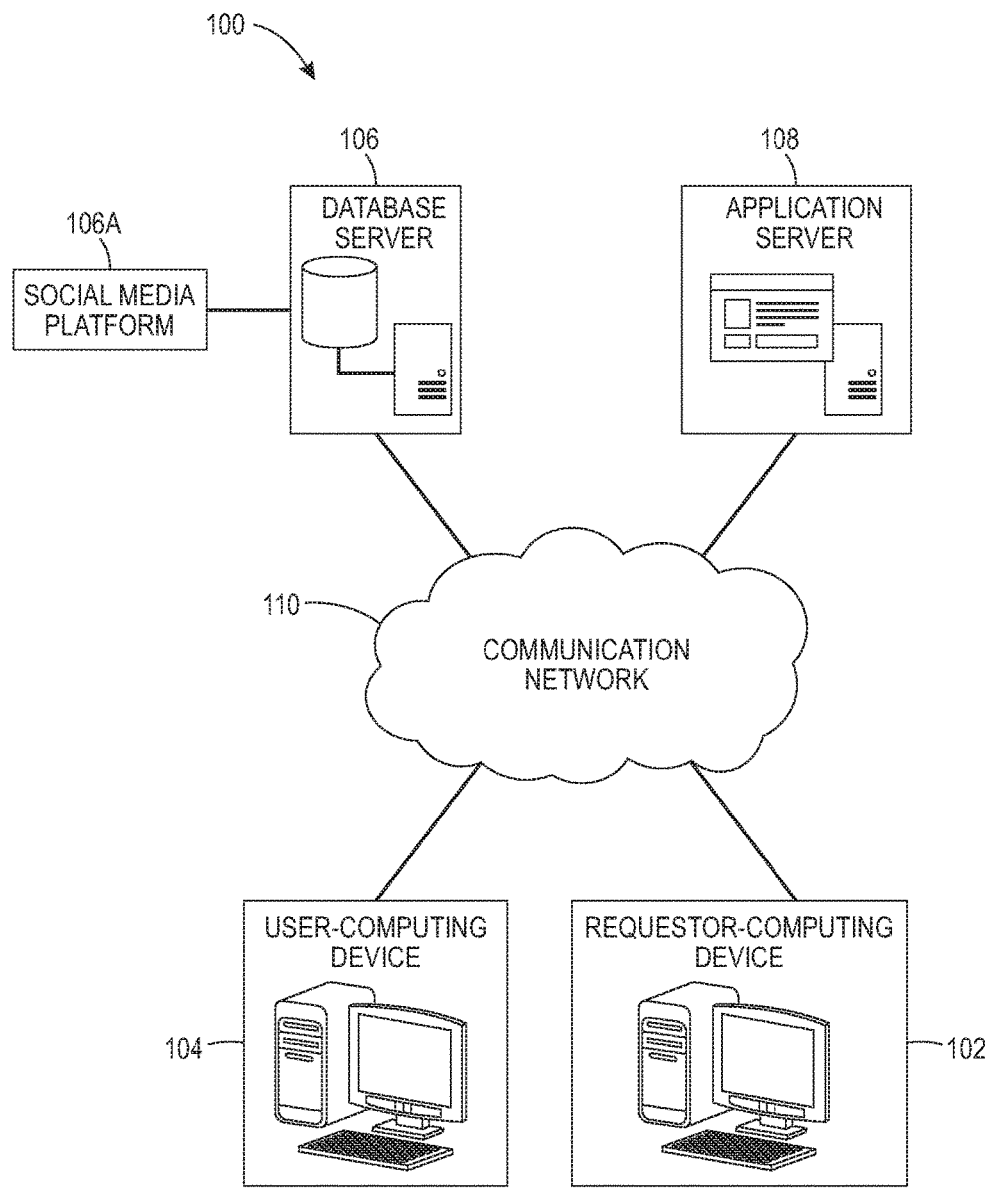
FIG. 1 is a block diagram of a system environment in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions

The following terms shall have, for the purposes of this application, the meanings set forth below.

A "computing device" refers to a computer, a device (that includes one or more processors/microcontrollers and/or any other electronic components), or a system (that performs one or more operations according to one or more sets of programming instructions, code, or algorithms) associated with an entity. The entity may correspond to an individual or an organization. In one exemplary scenario, the individual (e.g., a content provider) may utilize the computing device to transmit a request pertaining to processing of user data to a computing server for content recommendation. In another exemplary scenario, the individual (e.g., a user) may utilize the computing device to perform one or more actions (e.g., posting, sharing, tweeting, liking, or disliking messages) on one or more social media platforms. Further, the individual may utilize the computing device to view targeted content recommended by the content provider. Examples of the computing device may include, but are not limited to, a desktop computer, a laptop, a personal digital assistant (PDA), a mobile device, a smartphone, and a tablet computer (e.g., iPad® and Samsung Galaxy Tab®).

A "social media platform" refers to a communication medium through which one or more registered users interact with each other through one or more actions on one or more social media platforms. For example, the one or more registered users may post, share, tweet, like, or dislike one or more messages, images, or videos, on the one or more social media platforms. Examples of the one or more social media platforms include, but are not limited to, social networking websites (e.g., Facebook™, LinkedIn™ Twitter™, Instagram™, Google+™, and so forth), web-blogs, web-forums, community portals, online communities, or online interest groups.

A "requestor" refers to an individual who is associated with an entity, such as an organization. For example, the requestor may correspond to an administrator or a content provider in the organization, who may be interested in user's interests and preferences about one or more products, services, or events, such as movies, sports, travel, and/or the like. In another example, the requestor may correspond to a customer care agent, who is interacting with the user over a communication network.

A "user" refers to an individual, who is a member of one or more social media platforms. In an embodiment, the user may be registered with the one or more social media platforms as a member. During registration, the user provides information, such as name, gender, location, age, education, profession, images, and interests/hobbies, and/or the like. In an embodiment, the user may further utilize the one or more social media platforms to communicate with one or more other users. Further, the user may utilize the one or more social media platforms to post, share, tweet, like, or dislike one or more messages, images, or videos on the one or more social media platforms.

"Social media data" refers to data, such as one or more messages, images, videos, and/or the like, that may have been posted, shared, tweeted, liked, and/or disliked by a user on one or more social media platforms. In an embodiment, the social media data may further comprise the data pertaining to one or more replies, likes, and/or dislikes provided by the user on the one or more messages, images, videos, and/or the like, that are associated with one or more other users. Further, in an embodiment, the data in the social media data may be associated with one or more historical events or one or more future events. The events may be associated with one or more of, but not limited to, entertainment, arts, automobile, travel, sports, religion, food and drink, health, news, politics, education, transportation, defense, relationship, and technology.

A "message" refers to a series of words, phrases, sentences, emotions, and/or the like, that may have been posted, shared, tweeted, liked, or disliked by a user on one or more social media platforms. For example, the user may post one or more messages on Facebook™ or Twitter™. The posted one or more messages may be associated with one or more products, services, or events, such as sports, movies, travel, politics, and/or the like.

A "request" refers to a message, an instruction, or a query that is indicative of initiating a task or a process to achieve desired response. For example, an individual associated with an organization may raise the request, transmitted to a computing server, to process social media data of one or more users to infer user's interests and preferences for one or more products, services, or events, such as sports, movies, travel, politics, and/or the like. Such user's interests and preferences may be utilized by the individual for content recommendation to the one or more users.

A "set of entity data" refers to a set of data comprising at least one of one or more named entities and one or more keywords and phrases of interests. The one or more named entities may correspond to at least one of, but are not limited to, a name of a person, a place, and an animal. The one or more keywords and phrases of interests may be associated with least one of, but are not limited to, entertainment (e.g., movie, music, TV shows, celebrity, and/or the like), arts (e.g., performing arts, visual arts, fashion, design, books, and/or the like), society and culture (e.g., relationship, pets, food and drink, religion, and/or the like), and news (e.g., politics, sports, current events, business and economy, science and technology, and/or the like). In an embodiment, the one or more named entities and the one or more keywords and phrases of interests may be associated or interlinked with each other. In an embodiment, the set of entity data may be extracted from social media data of one or more users based on linguistic grammar (e.g., parts of speech) and/or one or more statistical models.

"Semantic data" of entity data refers to a set of keywords that is associated with semantic representations of the entity data. For example, the semantic data of the entity data may correspond to a type (e.g., a notable type) of the entity data. Further, the semantic data of the entity data may be extracted from one or more knowledge databases, such as Wikipedia™ or Freebase™.

A "knowledge database" refers to a repository of information. The information may be stored in a structured or unstructured format. In an embodiment, the knowledge database may correspond to, but not limited to, Wikipedia™ or Freebase™.

A "user-interest vector" of a user refers to one or more sets of data that are indicative of interests and preferences of the user for one or more products, services, and/or events (such as movies, sports, politics, travel, and/or the like). In an embodiment, the one or more sets of data in the user-interest vector and various data in each of the one or more sets of data are arranged in a pre-defined ranking order, for example, a highly interested and preferred set of data at top and a least interested and preferred set of data at bottom of the user-interest vector, or vice-versa.

A "user-profile vector" of a user refers to a set of data that is indicative of one or more personal and/or professional details of the user. For example, the user-profile vector may comprise data such as, but not limited to, full name, location, Email, profile image, and a description of the user.

A "user-demographic vector" of a user refers to a set of data that is indicative of at least one or more demographic attributes of the user. For example, the one or more demographic attributes may comprise data, such as, but not limited to, age, gender, parental status, and marital status of the user.

A "user model" refers to a schema that may be generated based on a user-profile vector, a user-demographic vector, and a user-interest vector of a user. The user model may be utilized by a requestor during an interaction or communication with the user. The requestor may further utilize the user model to infer the interest and preferences of the user that may further be utilized for recommending targeted content to the user.

A "taxonomy" refers to a scheme of classification of data into one or more categories. An interest taxonomy corresponds to the taxonomy that includes the classification of interest data, such as entrainment, arts, recreation, society and culture, health, news, politics, science and technology, education, travel, and so on, into the one or more categories. In an embodiment, the interest taxonomy may further include the classification of each of the one or more categories into one or more sub-categories, and so on. In an embodiment, the interest taxonomy may be represented in form of a graph comprising one or more leaf nodes, such that each leaf node corresponds to a category or a sub-category associated with the category.

A "user interface (UI)" refers to an interface or a platform that may facilitate an individual to interact with an associated computing device, such as a computer, a laptop, or a smartphone. The individual may utilize various input mediums to interact with the UI. Examples of such input mediums may include, but are not limited to, a keypad, mouse, joystick, any touch-sensitive medium (e.g., a touch-screen or touch sensitive pad), voice recognition, gestures, and video recognition. Hereinafter, the term "UI" is interchangeably referred to as "GUI."

FIG. 1 is a block diagram of a system environment in which various embodiments of a method and a system for processing social media data for content recommendation to a user may be implemented. With reference to FIG. 1, there is shown a system environment 100 that includes a requestor-computing device 102, a user-computing device 104, a database server 106, and an application server 108. The requestor-computing device 102, the user-computing device 104, the database server 106, and the application server 108 are communicatively coupled with each other over one or more communication networks, such as a communication network 110. For simplicity, FIG. 1 shows one requestor-computing device, such as the requestor-computing device 102, one user-computing device, such as the user-computing device 104, one database server, such as the database server 106, and one application server, such as the application server 108. However, it will be apparent to a person having ordinary skill in the art that the disclosed embodiments may also be implemented using multiple requestor-computing devices, multiple user-computing devices, multiple database servers, and multiple application servers, without deviating from the scope of the disclosure.

The requestor-computing device 102 may refer to a computing device (associated with a requestor) that may be communicatively coupled to the communication network 110. The requestor may correspond to an individual who is associated with an organization. For example, the requestor may correspond to a customer care agent, a service provider, or a content provider, who may want to infer interest and preference information of a user. The interest and preference information may be associated with one or more products, services, or events, such as entertainment, arts, health, education, sports, travel, and/or the like. In an embodiment, the requestor may utilize the requestor-computing device 102 to transmit a request to a computing server, such as the database server 106 or the application server 108, over the communication network 110. The transmitted request comprises a query that may instruct the application server 108 to process social media data of the user to infer the interest and preference information of the user. In an embodiment, the social media data comprises data, such as, but not limited to, profile information of the user, one or more messages, images, or videos that are posted, shared, liked, or disliked by the user on one or more social media platforms, a first list of other users that the user is following, and/or a second list of other users who are following the user. Further, in an embodiment, the requestor may utilize the requestor-computing device 102 to transmit one or more constraint parameters to a computing server, such as the database server 106 or the application server 108, over the communication network 110.

The requestor-computing device 102 may include one or more processors in communication with one or more memory units. Further, in an embodiment, the one or more processors may be operable to execute one or more sets of computer-readable code, instructions, programs, or algorithms, stored in the one or more memory units, to perform one or more operations. In an embodiment, the requestor may utilize the requestor-computing device 102 to communicate with the user-computing device 104, the database server 106, or the application server 108, via the communication network 110.

The requestor-computing device 102 may further include a display screen that may be configured to display one or more GUIs rendered by the application server 108 over the communication network 110. For example, the application server 108 may render a GUI displaying at least one of a user-interest vector, a user-profile vector, and a user-demographic vector of the user. Further, the application server 108 may render the GUI displaying a user model, generated based on the user-interest vector, the user-profile vector, and the user-demographic vector, of the user. Based on the user model of the user, the requestor may transmit another request to the application server 108 to render the content recommendation on the user-computing device 104 associated with the user. Further, in an embodiment, the requestor may utilize the requestor-computing device 102 to interact or communicate with one or more others users over the communication network 110 based on the user model of the one or more users.

Examples of the requestor-computing device 102 may include, but are not limited to, a personal computer, a laptop, a PDA, a mobile device, a tablet, or any other computing devices.

The user-computing device 104 may refer to a computing device (associated with the user) that may be communicatively coupled to the communication network 110. The user-computing device 104 may include one or more processors and one or more memory units. The one or more memory units may include computer-readable codes, instructions, or programs that are executable by the one or more processors to perform one or more operations.

In an embodiment, the user may utilize the user-computing device 104 to connect with the one or more social media platforms, such as a social media platform 106A. Prior to the connection, the user may connect the user-computing device 104 over a network, such as the communication network 110. Thereafter, the user may open a web browser, such as a Mozilla Firefox® web browser. Thereafter, the user may launch the one or more social media platforms, such as Facebook™, LinkedIn™ Twitter™, and/or Instagram™, on the user-computing device 104. In another embodiment, the user may launch the one or more social media platforms on the user-computing device 104 by using a web application installed on the user-computing device 104. Further, the user may utilize one or more input devices associated with the user-computing device 104 to input login credentials (e.g., user identifier and password). Based on the validation of the login credentials, the user may view his/her social media profile and related information on the user-computing device 104. Further, the user may utilize the one or more input devices to update his/her social media profile information. Further, the user may utilize the one or more input devices to perform one or more actions, such as posting, sharing, tweeting, liking, or disliking the one or more messages, images, videos, and/or the like, on the one or more social media platforms. Further, in an embodiment, the user may utilize the one or more input devices to share, like, or dislike the social media data that are posted by other users. The one or more actions of the user on the one or more social media platforms may be associated with the one or more products, services, or events.

The user-computing device 104 may further include a display screen that may be configured to display one or more GUIs rendered by the application server 108. For example, the application server 108 may render a GUI displaying the content recommended by the requestor. The content recommended by the requestor may be associated with the one or more products, services, or events. Further, in an embodiment, the user may utilize the user-computing device 104 to interact or communicate with the requestor over the communication network 110.

The user-computing device 104 may correspond to various types of computing devices, such as, but not limited to, a desktop computer, a laptop, a PDA, a mobile device, a smartphone, or a tablet computer.

The database server 106 may refer to a computing device or a storage device that may be communicatively coupled to the communication network 110. In an embodiment, the database server 106 may be configured to perform one or more database operations. Examples of the one or more database operations may include receiving/transmitting one or more queries, request, social media data, or content from/to one or more computing devices, such as the requestor-computing device 102, the user-computing device 104, or the application server 108. The one or more database operations may further include processing and storing the one or more queries, request, social media data, or content.

Further, in an embodiment, the database server 106 may be communicatively coupled with the one or more social media platforms, such as the social media platform 106A. In an embodiment, the database server 106 may receive a query from the requestor-computing device 102 or the application server 108. The query may correspond to the extraction of the social media data of the user from the social media platform 106A. Based on the received request, the database server 106 may extract the social media data of the user from the social media platform 106A. Thereafter, the database server 106 may store the extracted social media data. Further, in an embodiment, the database server 106 may transmit the social media data to the application server 108 over the communication network 110. The database server 106 may be further configured to store a set of entity data extracted from the social media data. The database server 106 may be further configured to store the user-interest vector, the user-profile vector, and the user-demographic vector of the user. The database server 106 may be further configured to store the generated user model of the user.

Further, in an embodiment, the database server 106 may store one or more sets of instructions, code, scripts, or programs that may be retrieved by the application server 108 to perform one or more operations. For querying the database server 106, one or more querying languages, such as, but not limited to, SQL, QUEL, and DMX, may be utilized. In an embodiment, the database server 106 may be realized through various technologies such as, but not limited to, Microsoft® SQL Server, Oracle®, IBM DB2®, Microsoft Access®, PostgreSQL®, MySQL® and SQLite®, MongoDB®, and/or the like.

The application server 108 may refer to a computing device or a software framework hosting an application or a software service that may be communicatively coupled to the communication network 110. In an embodiment, the application server 108 may be implemented to execute procedures, such as, but not limited to, the one or more sets of programs, instructions, code, routines, or scripts, stored in one or more memory units for supporting the hosted application or the software service. In an embodiment, the hosted application or the software service may be configured to perform the one or more operations of the application server 108.

In an embodiment, the application server 108 may be configured to receive the request, pertaining to the processing of the social media data of the user for the content recommendation, from the requestor-computing device 102 over the communication network 110. Further, based on the received request, the application server 108 may transmit the query to the database server 106 to extract the social media data of the user from the one or more social media platforms, such as the social media platform 106A. Thereafter, the application server 108 may receive the extracted social media data from the database server 106 over the communication network 110. In another embodiment, the application server 108 may extract the social media data of the user from the social media platform 106A over the communication network 110. Thereafter, in an embodiment, the application server 108 may be further configured to extract the set of entity data from the extracted social media data of the user. The extraction of the set of entity data has been described later in detail in conjunction with FIG. 3.

Further, in an embodiment, the application server 108 may be configured to extract semantic data of each entity data in the extracted set of entity data from one or more knowledge databases (e.g., Wikipedia™ or Freebase™) over the communication network 110. The semantic data of each entity data may correspond to at least a type (e.g., a notable type) of each entity data. The determination of the semantic data has been described later in detail in conjunction with FIG. 3. Further, in an embodiment, the application server 108 may be configured to generate the user-interest vector based on at least a mapping of the extracted semantic data of each entity data with one or more leaf nodes in an interest taxonomy. The application server 108 may be further configured to generate the user-profile vector and the user-demographic vector of the user based on at least the social media data. The generation of the user-interest vector, the user-profile vector, and the user-demographic vector of the user has been described later in detail in conjunction with FIG. 3. Further, in an embodiment, the application server 108 may be configured to generate the user model of the user based on at least the generated user-interest vector, the generated user-profile vector, and the generated user-demographic vector. The generation of the user model of the user has been described later in detail in conjunction with FIG. 3.

Further, in an embodiment, the application server 108 may utilize the generated user model of the user to recommend the targeted content to the user. The targeted content may comprise the recommendation of the one or more products, services, or events that may be of interest to the user. The targeted content may further comprise the recommendation of at least one or more offers, promos, coupons, or discounts associated with the one or more products, services, or events. Further, in an embodiment, the application server 108 may render the generated user model of the user on the GUI displayed on the display screen of the requestor-computing device 102. The requestor may utilize the rendered user model during the interaction or communication with the user over the communication network 110.

The application server 108 may be realized through various types of application servers, such as, but not limited to, a Java application server, a .NET framework application server, a Base4 application server, a PHP framework application server, or any other application server framework.

A person having ordinary skill in the art will understand that the scope of the disclosure is not limited to the database server 106 as a separate entity. In an embodiment, the one or more functionalities of the database server 106 may be integrated into the application server 108, or vice-versa, without deviating from the scope of the disclosure.

A person having ordinary skill in the art will understand that the scope of the disclosure is not limited to the requestor-computing device 102 as a separate entity. In an embodiment, the one or more functionalities of the requestor-computing device 102 may be integrated into the application server 108, or vice-versa, without deviating from the scope of the disclosure.

The communication network 110 may include a medium through which one or more devices, such as the requestor-computing device 102 and the user-computing device 104, and one or more servers, such as the database server 106, and the application server 108, may communicate with each other. Examples of the communication network 110 may include, but are not limited to, the Internet, a cloud network, a Wireless Fidelity (Wi-Fi) network, a Wireless Local Area Network (WLAN), a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), and/or a Metropolitan Area Network (MAN). Various devices in the system environment 100 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), Light Fidelity (Li-Fi), and/or other cellular communication protocols or Bluetooth (BT) communication protocols.

Figure 2:
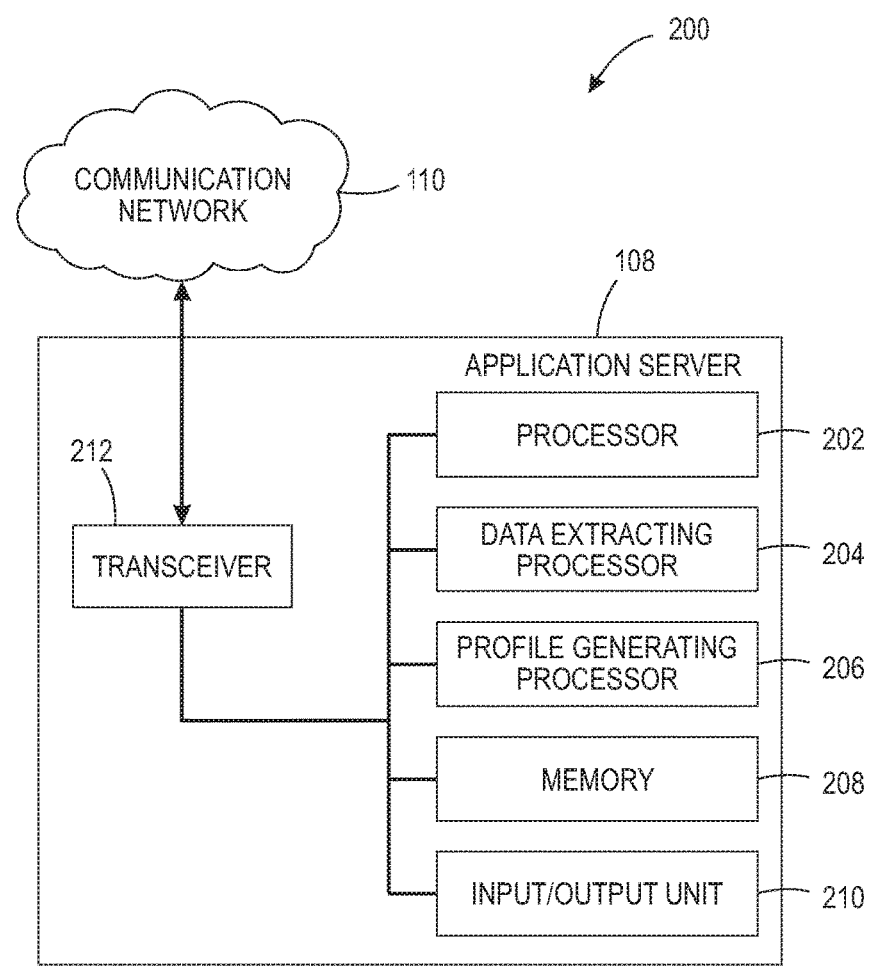
FIG. 2 is a block diagram that illustrates a system for processing social media data for content recommendation to a user, in accordance with at least one embodiment.

FIG. 2 is a block diagram that illustrates a system for processing social media data for content recommendation to a user, in accordance with at least one embodiment. With reference to FIG. 2, there is shown a system 200 that may include one or more processors, such as a processor 202, one or more data extracting processors, such as a data extracting processor 204, one or more profile generating processors, such as a profile generating processor 206, one or more memory units, such as a memory 208, one or more input/output (I/O) units, such as an I/O unit 210, and one or more transceivers, such as a transceiver 212.

The system 200 may correspond to a computing device, such as the requestor-computing device 102, or a computing server, such as the application server 108, without departing from the scope of the disclosure. However, for the purpose of the ongoing description, the system 200 corresponds to the application server 108.

The processor 202 comprises suitable logic, circuitry, interfaces, and/or code that may be configured to execute one or more sets of instructions, programs, or algorithms stored in the memory 208 to perform the one or more operations. For example, the processor 202 may be configured to render the GUI displayed on the display screen of the requestor-computing device 102 or the user-computing device 104 over the communication network 110. The rendered GUI may be configured to display one or more of, but not limited to, the generated user-interest vector, the generated user-profile vector, the generated user-demographic vector, the generated user model, and the targeted content. In an embodiment, the processor 202 may be communicatively coupled to the data extracting processor 204, the profile generating processor 206, the memory 208, the I/O unit 210, and the transceiver 212. The processor 202 may be implemented based on a number of processor technologies known in the art. Examples of the processor 202 may include, but not limited to, an X86-based processor, a Reduced Instruction Set Computing (RISC) processor, an Application-Specific Integrated Circuit (ASIC) processor, and a Complex Instruction Set Computing (CISC) processor.

The data extracting processor 204 comprises suitable logic, circuitry, interfaces, and/or code that may be configured to execute one or more sets of instructions, programs, or algorithms stored in the memory 208 to perform the one or more operations. In an embodiment, the data extracting processor 204 may be configured to extract the social media data of the user from the database server 106 or the social media platform 106A. In an exemplary scenario, the data extracting processor 204 may be configured to interact or communicate with specific application programming interfaces (APIs), such as Twitter REST® APIs, to extract the social media data of the user from corresponding database, such as the Twitter® database. The data extracting processor 204 may be further configured to extract the set of entity data from the extracted social media data of the user. The data extracting processor 204 may be further configured to extract the semantic data of each entity data in the extracted set of entity data. In an embodiment, the data extracting processor 204 may be communicatively coupled to the processor 202, the profile generating processor 206, the memory 208, the I/O unit 210, and the transceiver 212. The data extracting processor 204 may be implemented based on a number of processor technologies known in the art. For examples, the data extracting processor 204 may be implemented using one or more of, but not limited to, an X86-based processor, a Reduced Instruction Set Computing (RISC) processor, an Application-Specific Integrated Circuit (ASIC) processor, a Complex Instruction Set Computing (CISC) processor, and/or other processor. Examples of data extracting processor 204 may include, but not limited to PTC® Arbotext, Adobe® Framemaker, LyX®, and/or BroadVision QuickSilver®.

The profile generating processor 206 comprises suitable logic, circuitry, interfaces, and/or code that may be configured to execute one or more sets of instructions, programs, or algorithms stored in the memory 208 to perform the one or more operations. For example, the profile generating processor 206 may be configured to generate the user-interest vector, the user-profile vector, the user-demographic vector, and the user model of the user. The profile generating may be communicatively coupled to the processor 202, the data extracting processor 204, the memory 208, the I/O unit 210, and the transceiver 212. The profile generating processor 206 may be implemented based on a number of processor technologies known in the art. For example, the profile generating processor 206 may be implemented using one or more of, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 208 may be operable to store one or more machine code, and/or computer programs having at least one code section executable by the processor 202, the data extracting processor 204, the profile generating processor 206, the I/O unit 210, and/or the transceiver 212. The memory 208 may store one or more sets of instructions, programs, code, or algorithms that are executed by the processor 202, the data extracting processor 204, the profile generating processor 206, the I/O unit 210, and/or the transceiver 212 to perform the respective one or more operations. In an embodiment, the memory 208 may comprise one or more buffer units (not shown) that may be configured to store the extracted social media data, the extracted set of entity data, the extracted semantic data, the generated user-interest vector, the generated user-profile vector, the generated user-demographic vector, and the generated user model of the user. Further, the one or more buffers in the memory 208 may be configured to store the targeted content associated with the one or more products, services, or events that may be recommended to the user. Some of the commonly known memory implementations include, but are not limited to, a random access memory (RAM), a read-only memory (ROM), a hard disk drive (HDD), and a secure digital (SD) card. In an embodiment, the memory 208 may include the one or more machine code and/or computer programs that are executable by the processor 202, the data extracting processor 204, the profile generating processor 206, the I/O unit 210, and/or the transceiver 212 to perform the one or more specific operations. It will be apparent to a person having ordinary skill in the art that the one or more instructions stored in the memory 208 enables the hardware of the system 200 to perform the one or more operations.

The I/O unit 210 comprises suitable logic, circuitry, interfaces, and/or code that may be operable to facilitate the requestor to input one or more constraints parameters. For example, the requestor may utilize the I/O unit 210 to input the request pertaining to the processing of the social media data. The requestor may further utilize the I/O unit 210 to define a time duration to limit the extraction of the social media data from the social media platform 106A. The I/O unit 210 may be operable to communicate with the processor 202, the data extracting processor 204, the profile generating processor 206, the memory 208, and/or the transceiver 212. Further, in an embodiment, the I/O unit 210, in conjunction with the processor 202 and the transceiver 212, may be operable to provide the content recommendation to the user based on the generated user model of the user. In an embodiment, the content recommendation may be either in an audio form, a video form, a graphical form, or a text form. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a speaker system and a display screen.

The transceiver 212 comprises suitable logic, circuitry, interfaces, and/or code that may be configured to receive/transmit the one or more queries, social media data, content, or other information from/to one or more computing devices or servers (e.g., the requestor-computing device 102, the user-computing device 104, the database server 106, or the application server 108) over the communication network 110. The transceiver 212 may implement one or more known technologies to support wired or wireless communication with the communication network 110. In an embodiment, the transceiver 212 may include circuitry, such as, but not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 3:
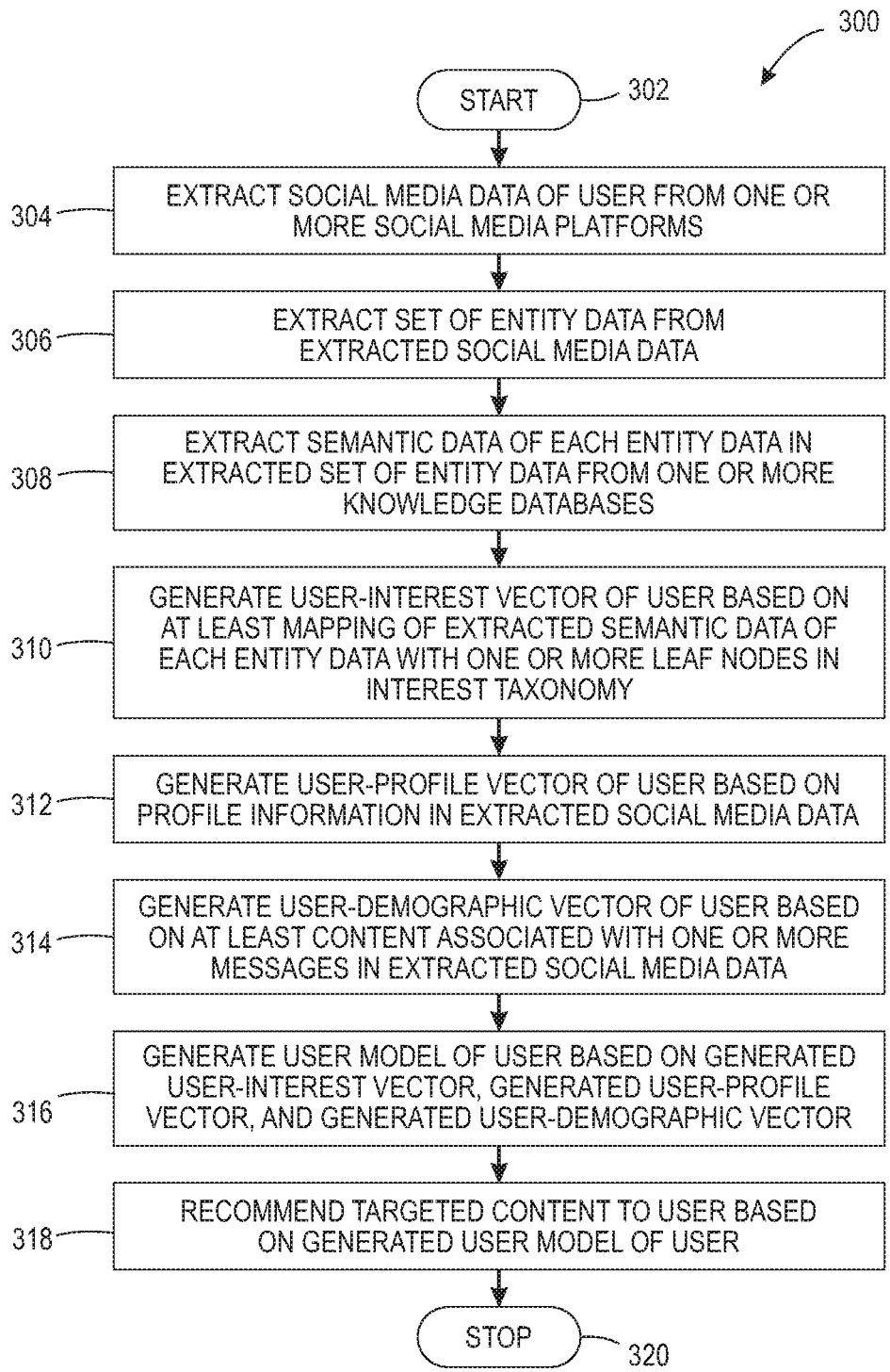
FIG. 3 is a flowchart that illustrates a method for processing social media data for content recommendation to a user, in accordance with at least one embodiment.

FIG. 3 is a flowchart that illustrates a method for processing social media data for content recommendation to a user, in accordance with at least one embodiment. With reference to FIG. 3, there is shown a flowchart 300 that is described in conjunction with FIG. 1 and FIG. 2. The method starts at step 302 and proceeds to step 304.

At step 304, the social media data of the user is extracted from the one or more social media platforms. In an embodiment, the data extracting processor 204 may be configured to extract the social media data of the user from the one or more social media platforms, such as the social media platform 106A, over the communication network 110. The extracted social media data may comprise historical data of the user on the social media platform 106A. For example, the extracted social media data may comprise historical profile information of the user. The extracted social media data may further comprise the one or more messages, images, or videos that had been posted, shared, liked, or disliked by the user on the social media platform 106A in the past. The extracted social media data may further comprise the first list of other users on the social media platform 106A whom the user may be following. The extracted social media data may further comprise the second list of other users on the social media platform 106A who may be following the user.

Prior to the extraction of the social media data of the user, the transceiver 212 may be configured to receive the request from the requestor-computing device 102 over the communication network 110. The received request may comprise the query that instructs the processor 202 to initiate the processing of the social media data of the user. The received request may further comprise the one or more constraint parameters, for example, the pre-defined time duration to limit the extraction of the social media data of the user from the social media platform 106A. Based on the received request, the data extracting processor 204 may extract the social media data of the user from the social media platform 106A over the communication network 110. After extracting the social media data of the user, the data extracting processor 204, in conjunction with the transceiver 212, may store the extracted social media data of the user in the storage device, such as the memory 208 or the database server 106.

At step 306, the set of entity data is extracted from the set of social media data. In an embodiment, the data extracting processor 204 may be further configured to extract the set of entity data from the extracted set of social media data. The set of entity data may correspond to a set of data comprising at least one of one or more named entities and one or more keywords and phrases of interests. In an embodiment, the one or more named entities and the one or more keywords and phrases of interests extracted from the social media data may be associated or interlinked with each other.

In an embodiment, the data extracting processor 204 may extract the set of entity data from the extracted social media data (e.g., the one or more messages) based on linguistic grammar (e.g., parts of speech) and/or one or more statistical models known in the art. The data extracting processor 204 may further utilize one or more toolkits known in the art, such as, a natural language toolkit, to extract the one or more named entities (e.g., name of famous person, place, animal, and/or the like) from the extracted social media data. The data extracting processor 204 may also process images and/or videos posted, mentioned or liked by the user, by use of feature extraction, object recognition, and automatic captioning techniques or methods, based on deep learning and other techniques to extract named entities (such as famous landmarks, famous people and common objects appearing in video frames and images). Further, in an embodiment, the data extracting processor 204 may utilize one or more APIs, such as, the Twitter REST® API, to extract the first list of other users, who are being followed by the user. One or more users in the extracted first list of other users may correspond to one or more celebrities or authorities whose domain of expertise may be an indicator of the interests and preferences of the user. In an embodiment, for each user in the first list of other users, the processor 202 may be configured to determine a count of users, who are following each user in the first list of other users. In an embodiment, if for a user in the first list of other users, the processor 202 determines that the determined count of user, who are following the user in the first list of other users, is greater than a pre-defined threshold value (e.g., "5000"), the processor 202 may identify the user in the first list of other users as a celebrity. The names of these identified celebrities or authorities constitute the one or more named entities in the set of entity data. In an embodiment, the processor 202 may further filter the one or more named entities in the set of entity data based on a response of the user against the social media data of the one or more named entities. Further, the processor 202 may filter the one or more named entities in the set of entity data based on at least a mention of the one or more named entities in the social media data of the user. After extracting the set of entity from the extracted set of social media data, the data extracting processor 204 may store the extracted set of entity data in the storage device, such as the memory 208 or the database server 106. In a scenario where the social media data includes the one or more images or videos, then the data extracting processor 204 may utilize one or more image/video processing techniques, known in the art, to identify one or more objects, landmarks, or persons in the one or more images or videos. Thereafter, the data extracting processor 204 may utilize the one or more knowledge databases to determine the one or more named entities and/or the one or more keywords and phrases of interests based on the identified one or more objects, landmarks, or persons in the one or more images or videos.

At step 308, the semantic data of each entity data in the extracted set of entity data is extracted from the one or more knowledge databases. In an embodiment, the data extracting processor 204 may be further configured to extract the semantic data of each entity data in the extracted set of entity data from the one or more knowledge databases over the communication network 110. The semantic data of each entity data corresponds to a set of keywords that may indicate the semantic representation of each entity data in the extracted set of entity data. In an embodiment, the data extracting processor 204 may transmit a query to the one or more knowledge databases (e.g., Wikipedia™ or Freebase™) to extract the semantic data of each of the extracted set of entity data. In an exemplary scenario, the semantic data may correspond to the notable type pertaining to each of the extracted set of entity data. The notable type is associated with one or more topics of articles pertaining to the one or more named entities and/or the one or more keywords and phrases of interests in the extracted set of entity data. For example, "Barack Obama" returns the notable type as "government/US president." In another example, "Katy Perry" returns the notable type as "celebrities/celebrity." After extracting the semantic data of each entity data, the data extracting processor 204 may store the extracted semantic data of each entity data in the extracted set of entity data in the storage device, such as the memory 208 or the database server 106.

At step 310, the user-interest vector of the user is generated based on at least a mapping of the extracted semantic data of each entity data with the one or more leaf nodes in the interest taxonomy. The interest taxonomy may be application specific, ranging from broad-based taxonomies for general user models to fine-grain taxonomies (such as automobiles, movies, music, and/or the like) for more specific product recommendations. In an embodiment, the profile generating processor 206 may be configured to generate the user-interest vector of the user based on at least the mapping of the extracted semantic data of each entity data in the extracted set of entity data with the one or more leaf nodes in the interest taxonomy. In an embodiment, the interest taxonomy corresponds to a taxonomy of one or more interests and preferences that may be associated with the one or more products, services, and/or events, such as entertainment, arts, recreation, society and culture, health, news, technology, and/or the like. In an exemplary scenario, the interest taxonomy may be represented as a hierarchal structure comprising the one or more leaf nodes. The one or more leaf nodes in the interest taxonomy may correspond to one or more categories or classes that are representative of the one or more interests and preferences. The one or more leaf nodes may be further representative of one or more sub-categories of each of the one or more categories.

Prior to the generation of the user-interest vector, the profile generating processor 206 may retrieve the interest taxonomy from the storage device, such as the memory 208 or the database server 106. The retrieval of the interest taxonomy may be dependent upon one or more application areas as defined by the requestor, such as the customer care agent or the content provider. The retrieval of the interest taxonomy may be further dependent upon the user of the social media platform 106. In another embodiment, the processor 202 may be configured to generate the interest taxonomy based on the one or more application areas defined by the requestor, one or more users of the one or more social media platforms, and/or one or more content of recommendations.

After retrieving (or generating) the interest taxonomy, the profile generating processor 206 may be configured to map each of the set of keywords in the extracted semantic data of each of the extracted set of entity data with the one or more leaf nodes in the interest taxonomy. In an embodiment, the profile generating processor 206 may perform the mapping based on word embedding, where each word or phrase is mapped to a vector space based on a neural net language model that is trained on Wikipedia™ The profile generating processor 206 may map a keyword in the set of keywords to a nearest leaf node (i.e., nearest interest category) based on a distance between vector representations of the keyword and the nearest leaf node. For example, the profile generating processor 206 may determine the vector representation of the keyword. Further, the profile generating processor 206 may determine the vector representation of each of the one or more leaf nodes in the taxonomy. Thereafter, the profile generating processor 206 may determine the distance between the keyword and each of the one or more leaf nodes in the interest taxonomy based on the determined vector representations associated with the keyword and each of the one or more leaf nodes in the interest taxonomy. Thereafter, the profile generating processor 206 may map the keyword to a leaf node in the one or more leaf nodes of the interest taxonomy that is having the shortest distance among the determined distances. Similarly, the profile generating processor 206 may map each of remaining keywords in the set of keywords associated with each of the extracted set of entity data based on the shortest distance. Further, in an embodiment, the profile generating processor 206 may utilize the generated mapping to generate the user-interest vector of the user.

Thereafter, the profile generating processor 206 may store the generated user-interest vector of the user in the storage device, such as the memory 208 or the database server 106. Further, in an embodiment, the processor 202 may utilize the generated user-interest vector of the user to infer the interests and preferences of the user that may further be utilized for recommending the targeted content to the user.

In one embodiment, the user-interest vector may represent the collective interests and preferences of the one or more named entities found in the social media data of the user. Let "$n_i^j$" be a fraction of named entities for the user "j" mapped to an interest "i," where $\Sigma_i \, n_i^j = 1$. A binary representation of the user-interest vector "$V_B^j$" for the user "j" may be represented as $$V_B^j(i) = \begin{array}{l} 1 \text{ if } n_i^j > 0 \\ 0 \text{ if } n_i^j = 0 \end{array}.$$

An alternate representation for the user-interest vector is a normalized vector "$V_N^j$," which may be represented as $V_N^j = n_i^j \, r_i$, where "$r_i$" is a relative importance of the interest "i." The normalized user-interest vector representation is similar to a term frequency-inverse document frequency (TF-IDF) score for words in a document collection, and may help to improve the score of less popular interests which may only have a few named entities associated with them. The relative importance of the interest "i" may be written as $$r_i = \frac{N_u}{N_{u,i}},$$

where "$N_u$" is number of users in a test sample, "$N_{u,i}$" is number of users in "$N_u$" with the interest "i."

At step 312, the user-profile vector of the user is generated based on the profile information in the extracted social media data. In an embodiment, the profile generating processor 206 may be further configured to generate the user-profile vector of the user based on the profile information in the extracted social media data. The profile generating processor 206 may retrieve the historical profile information of the user from the storage device, such as the memory 208 or the database server 106. The historical profile information of the user comprises all profile-related information that may had been updated several times in the past. Based on the historical profile information of the user in the extracted social media data, the profile generating processor 206 may be configured to identify one or more relevant profile information, such as full name, location, Email, contact number, description and/or the like. Further, the profile generating processor 206 may generate the user-profile vector of the user based on at least the identified one or more relevant profile information. Thereafter, the profile generating processor 206 may store the generated user-profile vector of the user in the storage device, such as the memory 208 or the database server 106. Further, in an embodiment, the processor 202 may utilize the generated user-profile vector for recommending the targeted content to the user.

At step 314, the user-demographic vector of the user is generated based on at least the content associated with the one or more messages in the extracted social media data. In an embodiment, the profile generating processor 206 may be further configured to generate the user-demographic vector of the user based on at least the content associated with the one or more messages in the extracted social media data. For generating the user-demographic vector of the user, the profile generating processor 206 may utilize only one or more recent messages in the one or more messages in the extracted social media data. The profile generating processor 206 may identify the one or more recent messages based on a time line provided by the requestor, for example, "1 day," "1 week," "1 month" and/or the like.

Further, in an embodiment, the profile generating processor 206 may utilize a trained classifier, that utilizes standard supervised classification technique, to obtain the one or more demographic attributes of the user. For example, the profile generating processor 206 may input the content of the one or more recent messages to the trained classifier to obtain the one or more demographic attributes, such as age, gender, parental status, marital status, and/or the like, of the user.

Prior to obtaining the one or more demographic attributes of the user, the classifier is trained using training dataset in supervised learning phase. The training dataset is determined based on historical data (e.g., historical messages) with manually labeled demographic attributes. During the training, the classifier may learn the important textual features from the training dataset. Based on the learning, the trained classifier may identify the one or more demographic attributes, such as age, gender, parental status, marital status, and/or the like, of the user. Thereafter, the profile generating processor 206 may utilize the one or more demographic attributes of the user to generate the user-demographic vector. Thereafter, the profile generating processor 206 may store the generated user-demographic vector of the user in the storage device, such as the memory 208 or the database server 106. Further, in an embodiment, the processor 202 may utilize the generated user-demographic vector of the user for recommending the targeted content to the user.

At step 316, the user model of user is generated based on the generated user-interest vector, the generated user-profile vector, and the generated user-demographic vector. In an embodiment, the profile generating processor 206 may be further configured to generate the user model of user based on the generated user-interest vector, the generated user-profile vector, and the generated user-demographic vector. Thereafter, the profile generating processor 206 may store the generated user model of the user in the storage device, such as the memory 208 or the database server 106. Further, in an embodiment, the processor 202 may be configured to render the generate user model on the GUI displayed on the display screen of the requestor-computing device 102. The requestor may utilize the rendered user model of the user during the interaction or the communication with the user over the communication network 110.

At step 318, the targeted content is recommended to the user based on the generated user model. In an embodiment, the processor 202 may be configured to recommend the targeted content to the user based on the generated user model of the user. The targeted content may comprise the information associated with the one or more products, services, or events that may of interest to the user. The control passes to the end step 320.

Figure 4:
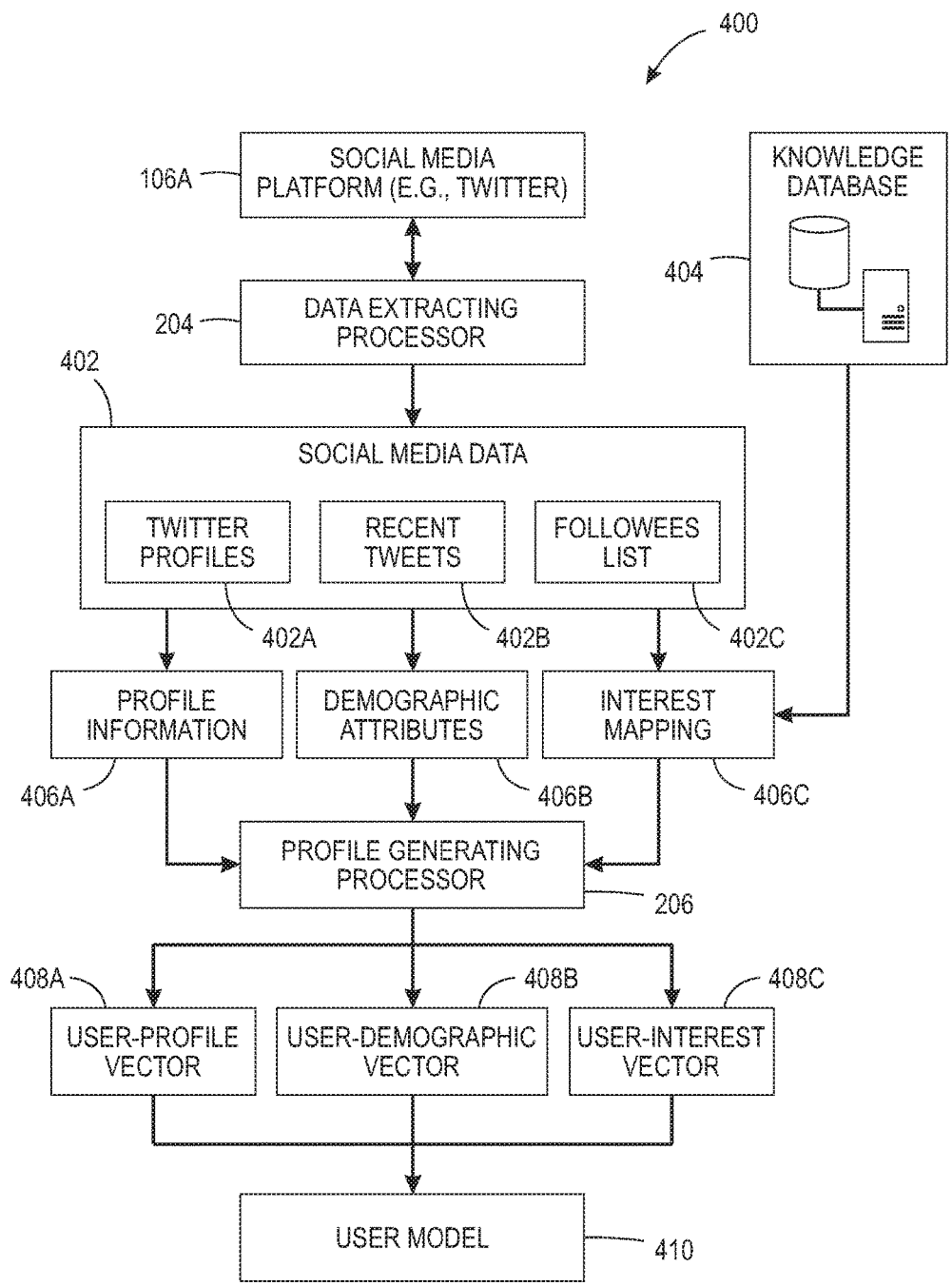
FIG. 4 is a block diagram that illustrates an exemplary workflow for generating a user model of a user, in accordance with an embodiment.

FIG. 4 is a block diagram that illustrates an exemplary workflow for generating a user model of a user, in accordance with an embodiment. With reference to FIG. 4, there is shown a block diagram 400 that is described in conjunction with elements from FIGS. 1-3.

With reference to FIG. 4, the data extracting processor 204 may transmit the query, generated based on the request received from the requestor-computing device 102, to the social media platform 106A (e.g., Twitter™) to extract the social media data (denoted by 402) of the user. The data extracting processor 204 may communicate with one or more APIs of the social media platform 106A (e.g., Twitter™) to extract the social media data (denoted by 402) of the user. The social media data (denoted by 402) may comprise at least twitter profiles (denoted by 402A), recent tweets (denoted by 402B), and followees list (denoted by 402C). Thereafter, the profile information (denoted by 406A) is extracted from the twitter profiles (denoted by 402A) in the extracted social media data (denoted by 402). Further, the one or more demographic attributes (denoted by 406B) are identified from the recent tweets (denoted by 402B) in the extracted social media data (denoted by 402) by use of the trained classifier. Further, an interest mapping (denoted by 406C) is generated based on at least the one or more named entities in the recent tweets (denoted by 402B) and the followees list (denoted by 402C) in the extracted social media data (denoted by 402) by use of the one or more knowledge databases (denoted by 404), such as Freebase™.

Further, in an embodiment, the profile generating processor 206 may utilize the profile information (denoted by 406A) to generate the user-profile vector (denoted by 408A). Further, in an embodiment, the profile generating processor 206 may utilize the one or more demographic attributes (denoted by 406B) to generate the user-demographic vector (denoted by 408B). Further, in an embodiment, the profile generating processor 206 may utilize the interest mapping (denoted by 406C) to generate the user-interest vector (denoted by 408C). Further, in an embodiment, the profile generating processor 206 may utilize the user-profile vector (denoted by 408A), the user-demographic vector (denoted by 408B), and the user-interest vector (denoted by 408C) to generate the user model (denoted by 410) of the user. The processor 202 may render the user model (denoted by 410) of the user on the GUI of the requestor-computing device 102 over the communication network 110. The requestor may utilize the user model (denoted by 410) during the interaction or communication with the user. Further, the requestor may utilize the user model (denoted by 410) to infer the interest and preferences of the user that may further be utilized for recommending the targeted content to the user.

The disclosed embodiments encompass numerous advantages. The disclosure provides a method and a system for processing the social media data for the content recommendation to the user. The disclosed system facilitates the generation of the user's interest profile automatically from the social media data of the user extracted from the one or more social media platforms. More specifically, the disclosed system extracts the one or more named entities from the social media data and map these entities to the one or more leaf nodes in the interest taxonomy using the one or more external knowledge databases, such as Wikipedia™ or Freebase™. The disclosed system further facilitates the generation of the user model of the user based on the extracted social media data. The user model includes the information from user's profile on the one or more social media platforms, demographic information (such as sex, age and marital status inferred from the user's recent social media data), and user interests based on the user's twitter followee lists. The disclosed system further renders the generated user model of the user for visualization to the requestor, such as the customer care agent or the service provider. Such generated user model may be further be utilized for inferring the interests and preferences of the user that may be further utilized for the content recommendation.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for processing social media data for content recommendation to a user. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person having ordinary skill in the art will appreciate that the systems, modules, and sub-modules have been illustrated and described to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for processing social media data, by a computing server, for content recommendation to a user, said method comprising:

extracting, by a data extracting processor at said computing server, a set of entity data from said social media data of said user;

extracting, by said data extracting processor, semantic data of each entity data in said extracted set of entity data from one or more knowledge databases over a communication network, wherein said semantic data corresponds to at least a notable type of said entity data;

generating, by a profile generating processor at said computing server, a user-interest vector of said user based on at least a mapping of said extracted semantic data of said each entity data with one or more leaf nodes in an interest taxonomy, wherein said user-interest vector is utilized for recommending targeted content to said user;

generating, by said profile generating processor, a user-profile vector of said user from profile information in said social media data;

generating, by said profile generating processor, a user-demographic vector of said user based on at least content associated with one or more messages in said social media data;

generating, by said profile generating processor, a user model of said user based on said generated user-interest vector, said generated user-profile vector, and said generated user-demographic vector;

rendering, by a processor at said computing server, said generated user model of said user on a user interface displayed on a display screen of a computing device associated with a requestor; and transmitting, by a processor at said computing server, the targeted content for display on a computing device of the user.

2. The method of claim 1, wherein said social media data of said user is extracted, by said data extracting processor, from one or more social media platforms over said communication network, wherein said social media data comprises at least profile information of said user, one or more messages, images, or videos that are posted, shared, liked, or disliked by said user on said one or more social media platforms, and a list of social media users that said user follows.

3. The method of claim 1, wherein said set of entity data comprises at least one of one or more named entities and one or more keywords and phrases of interest.

4. The method of claim 1, wherein said extracted semantic data of said each entity data further corresponds to at least a type of said entity data.

5. The method of claim 1, wherein said mapping is based on at least a distance between said semantic data and said one or more leaf nodes in said interest taxonomy.

6. The method of claim 1, wherein said user-profile vector comprises one or more of a name, an address, an e-mail, a location, and a profile image.

7. The method of claim 1, wherein said one or more messages are associated with a time constraint, wherein said user-demographic vector comprises one or more of age, gender, parental status, and marital status of said user.

8. The method of claim 7, wherein said recommendation of said targeted content to said user is based on said generated user model of said user, wherein said targeted content comprises information about one or more products, services, and events, including movies, and/or sports.

9. A system for processing social media data for content recommendation to a user, said system comprising:

a data extracting processor configured to:

extract a set of entity data from said social media data of said user;

extract semantic data of each entity data in said extracted set of entity data from one or more knowledge databases over a communication network, wherein said semantic data corresponds to at least a notable type of said entity data;

a profile generating processor configured to:

generate a user-interest vector of said user based on at least a mapping of said extracted semantic data of said each entity data with one or more leaf nodes in an interest taxonomy, wherein said user-interest vector is utilized for recommending targeted content to said user, generate a user-profile vector of said user from profile information in said social media data, generate a user-demographic vector of said user based on at least content associated with one or more messages in said social media data, and generate a user model of said user based on said generated user-interest vector, said generated user-profile vector, and said generated user-demographic vector; and a server processor configured to:

render said generated user model of said user on a user interface displayed on a display screen of a computing device associated with a reguestor, and transmit the targeted content for display on a computing device of the user.

10. The system of claim 9, wherein said data extracting processor is configured to extract said social media data of said user from one or more social media platforms over said communication network, wherein said social media data comprises at least profile information of said user, one or more messages, images, or videos that are posted, shared, liked, or disliked by said user on said one or more social media platforms, and a list of social media users that said user follows.

11. The system of claim 9, wherein said set of entity data comprises at least one of one or more named entities and one or more keywords and phrases of interest, and wherein said extracted semantic data of said each entity data further corresponds to at least a type of said entity data.

12. The system of claim 9, wherein said mapping is based on at least a distance between said semantic data and said one or more leaf nodes in said interest taxonomy.

13. The system of claim 9, wherein said user-profile vector comprises one or more of a name, an address, an e-mail, a location, and a profile image.

14. The system of claim 9, wherein said one or more messages, images, or videos are associated with a time constraint, wherein said user-demographic vector of said user comprises one or more of age, gender, parental status, and marital status of said user.

15. The system of claim 9, wherein said recommendation of said targeted content to said user is based on said generated user model of said user, wherein said targeted content comprises information about one or more products, services, and events, including movies, and/or sports.

16. A computer program product for use with a computer, said computer program product comprising a non-transitory computer readable medium, wherein said non-transitory computer readable medium stores a computer program code for processing social media data for content recommendation to a user, wherein said computer program code is executable by one or more processors in a computing device to:

extract a set of entity data from said social media data of said user extracted from one or more social media platforms over a communication network;

extract semantic data of each entity data in said extracted set of entity data from one or more knowledge databases over said communication network, wherein said semantic data corresponds to at least a notable type of said entity data;

generate a user-interest vector of said user based on at least a mapping of said extracted semantic data of said each entity data with one or more leaf nodes in an interest taxonomy, wherein said user-interest vector is utilized for recommending targeted content to said user;

generate a user-profile vector of said user from profile information in said social media data;
generate a user-demographic vector of said user based on at least content associated with one or more messages in said social media data;
generate a user model of said user based on said generated user-interest vector, said generated user-profile vector, and said generated user-demographic vector;
render said generated user model of said user on a user interface displayed on a display screen of a computing device associated with a reguestor; and
transmit the targeted content for display on a computing device of the user.

* * * * *